United States Patent
Lee et al.

(10) Patent No.: US 6,901,152 B2
(45) Date of Patent: May 31, 2005

(54) VISUAL PROFILE CLASSIFICATION

(75) Inventors: Harry C. Lee, Maitland, FL (US); Johnnie J. Sanders, Orlando, FL (US); Teresa L. Olson, Winter Garden, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 169 days.

(21) Appl. No.: 10/405,691

(22) Filed: Apr. 2, 2003

(65) Prior Publication Data

US 2004/0197010 A1 Oct. 7, 2004

(51) Int. Cl.[7] .................................................. G06K 9/00
(52) U.S. Cl. ....................................... 382/103; 382/224
(58) Field of Search ................................ 382/103, 100, 382/190, 195, 203, 224, 170, 276, 280, 277; 348/91, 148

(56) References Cited

U.S. PATENT DOCUMENTS

| | | | | |
|---|---|---|---|---|
| 5,848,193 A | * | 12/1998 | Garcia | 382/232 |
| 5,982,934 A | * | 11/1999 | Villalba | 382/226 |
| 6,151,424 A | * | 11/2000 | Hsu | 382/294 |
| 6,650,779 B2 | * | 11/2003 | Vachtesvanos et al. | 382/228 |

* cited by examiner

*Primary Examiner*—Yon J. Couso
(74) *Attorney, Agent, or Firm*—Jeffrey D. Myers; Peacock Myers & Adams PC

(57) ABSTRACT

An automated method of, and computer software and apparatus for, classifying objects visually into one of a plurality of object types comprising receiving a still image including an object, bounding the object within the image, dividing the bound portion of the image into a plurality of profile sections, performing a transform on each of the profile sections selected from discrete cosine transforms and discrete Fourier transforms, and executing a Bayes classifier function to segregate the object into one of the object types.

20 Claims, 21 Drawing Sheets

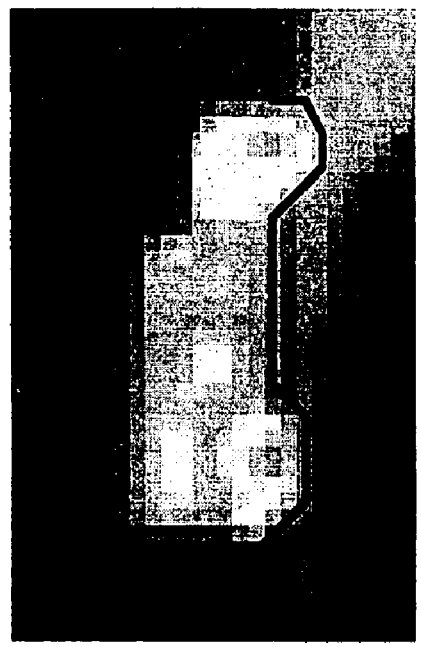
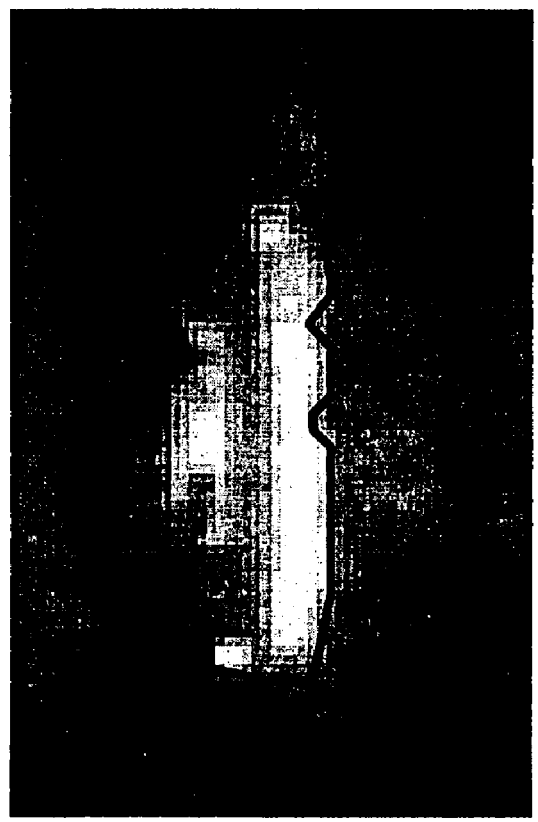
Figure 4

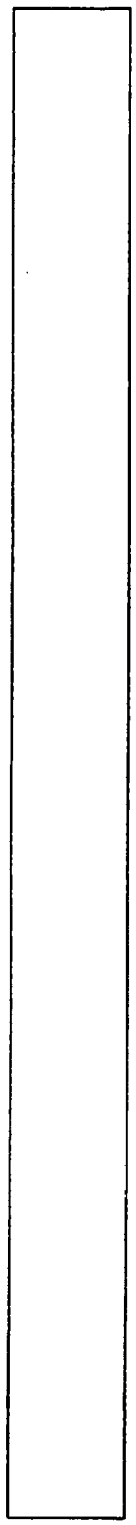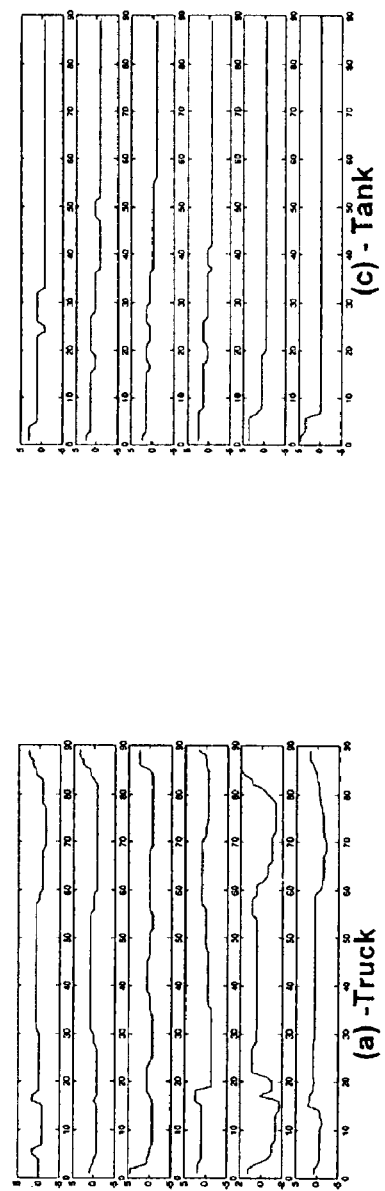
Figure 5

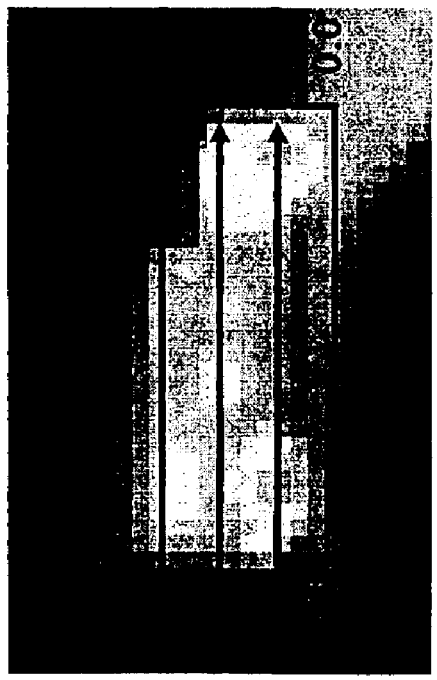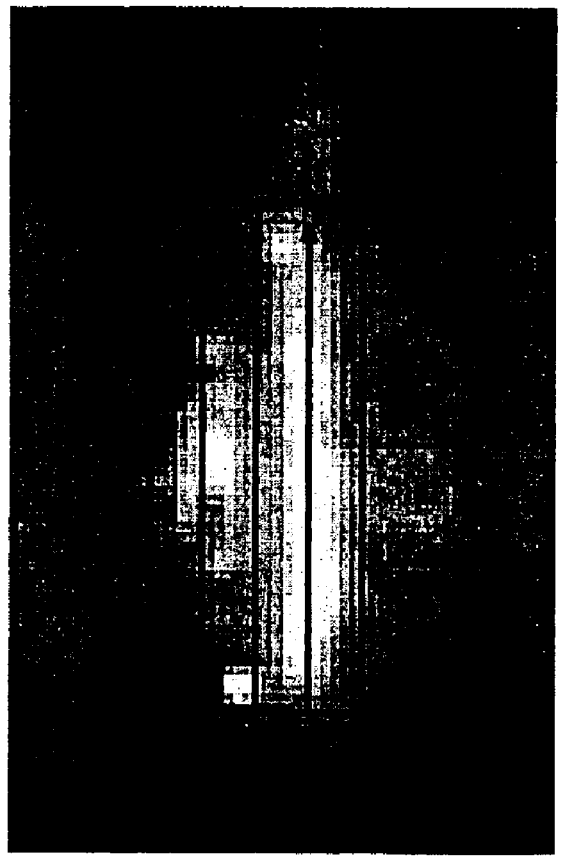
Figure 6

VISUAL PROFILE CLASSIFICATION

BACKGROUND OF THE INVENTION

1. Field of the Invention (Technical Field)

The present invention relates to automatic visual classification of objects.

2. Background Art

Automatic Target Recognition ("ATR") has been an area of work for little less than a half a century. While no universal solution has arisen to date, which is to be expected, what has been accomplished in that time frame is a wealth of approaches which have had varying degrees of success in addressing constrained problem sets. These techniques count on the extraction of imagery information along with a priori knowledge of the particular problem scenario. By restricting the problem set one can make systems that have proven to be useful for automatic unaided operation.

FIG. 1 shows some of the analysis tools that give an ATR the capability of drawing a conclusion about the object under observation. The ATR paradigm can be model driven and this requires a matching strategy and reference model database to act as exemplars to be matched against. Or, it can use a statistical approach based on feature analysis, with the proper restrictions, to draw useful conclusions. In the last few decades an applique of higher-level reasoning has proven to improve the overall ATR's performance.

Approaches for image-based ATR systems vary widely, however, their common goal is to extract information in order to identify objects of interest. Many approaches are based on image phenomenology principles that reflect the basis of human reasoning. Simplicity has also been a quality of many of the techniques that have been implemented in real-time systems. These fundamentals form the foundation of the present invention, referred to as the Visual Profile Classifier ("VPC"). The VPC quantifies visual cues that allow people to categorize various groups of similar object types independent from view angles and other conditions. The VPC technique of the invention can be applied differently depending on specific ATR requirements. It can range from silhouette and size analysis to complete principle component representation.

SUMMARY OF THE INVENTION (DISCLOSURE OF THE INVENTION)

The present invention is of an automated method of, and computer software and apparatus for, classifying objects visually into one of a plurality of object types, comprising: receiving a still image including an object; bounding the object within the image; dividing the bound portion of the image into a plurality of profile sections; performing a transform on each of the profile sections selected from the group consisting of discrete cosine transforms and discrete Fourier transforms; and executing a Bayes classifier function to segregate the object into one of the object types. In one embodiment, the object is a vehicle and the plurality of object types comprises a wheeled vehicle type and a tracked vehicle type. In the preferred embodiment, executing comprises executing a naive Bayes classifier function. Clutter removal is performed after the bounding step. Non-linear edge-enhancement is preferably performed on the image before dividing, preferably with performance of a Sobel function on the image before dividing step, and most preferably with performance of a thresholding function on the image after performing the Sobel function and before dividing.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 4 is an illustration of the silhouette analysis component of the present invention at an intuitive level;

FIGS. 5(a)–(d) illustrates the silhouette analysis component of the present invention at the Fourier analysis level;

FIG. 6 is a first illustration of the profile analysis component of the present invention at an intuitive level and performed across the object (horizontally);

DESCRIPTION OF THE PREFERRED EMBODIMENTS (BEST MODES FOR CARRYING OUT THE INVENTION)

This present invention is of a method of and system for automatic object classification. The example discussed in this application is the automated determination whether a vehicle is wheeled or treaded. The VPC method and system of the invention is based on sound physical and computing principles. The VPC's goal is to classify detected targets using target profiles obtain from a variety of altitudes across the target extraction. The VPC can be applied in different strengths depending on the objectives. In its least structured form it can use silhouette and size estimates and categorize targets into general categories. At its most structured it will take on the appearance of a principal component analysis finding the specific target identity.

The following presents the steps followed by the VPC:

1. Target Localization—This is accomplished by determining the centroid followed by a novel gradient analysis to determine the target extent.

2. Profile Analysis—Using the enclosed target extent determined above, horizontal and/or vertical profiles are determined for the candidate target. The position of the profiles is determined such that location and analysis of the profiles mimics the process a person goes through in analyzing an image to determine if it is in one class or another.

3. Silhouette Analysis—Similar to the profile analysis, except that it is done on the outline of the candidate target.

4. Wave Normalization—All one-dimensional signals extracted by the Profile or Silhouette analysis are normalized to some convenient length. The peaks of the signals are then suppressed to reduce the effects of hotspots 5. Discrete Fourier and/or Cosine Transform—This involves transformation of the one-dimensional signals to a space in which frequency analysis can be done on each waveform.

6. Fourier Feature Reduction—Using just the lower frequencies of the waveform, a better generic match can be made between the various classes.

7. Bayes Classification—Once all the features have been extracted it now possible to use a standard Bayes training and classification step. Bayesian classifiers assign the most likely class to a given example described by its feature vector. Learning such classifiers can be greatly simplified by assuming that features are independent given class. Despite such an unrealistic assumption, the resulting classifier known as "naive Bayes" is remarkably successful in practice, often competing with much more sophisticated techniques.

Figure 1:
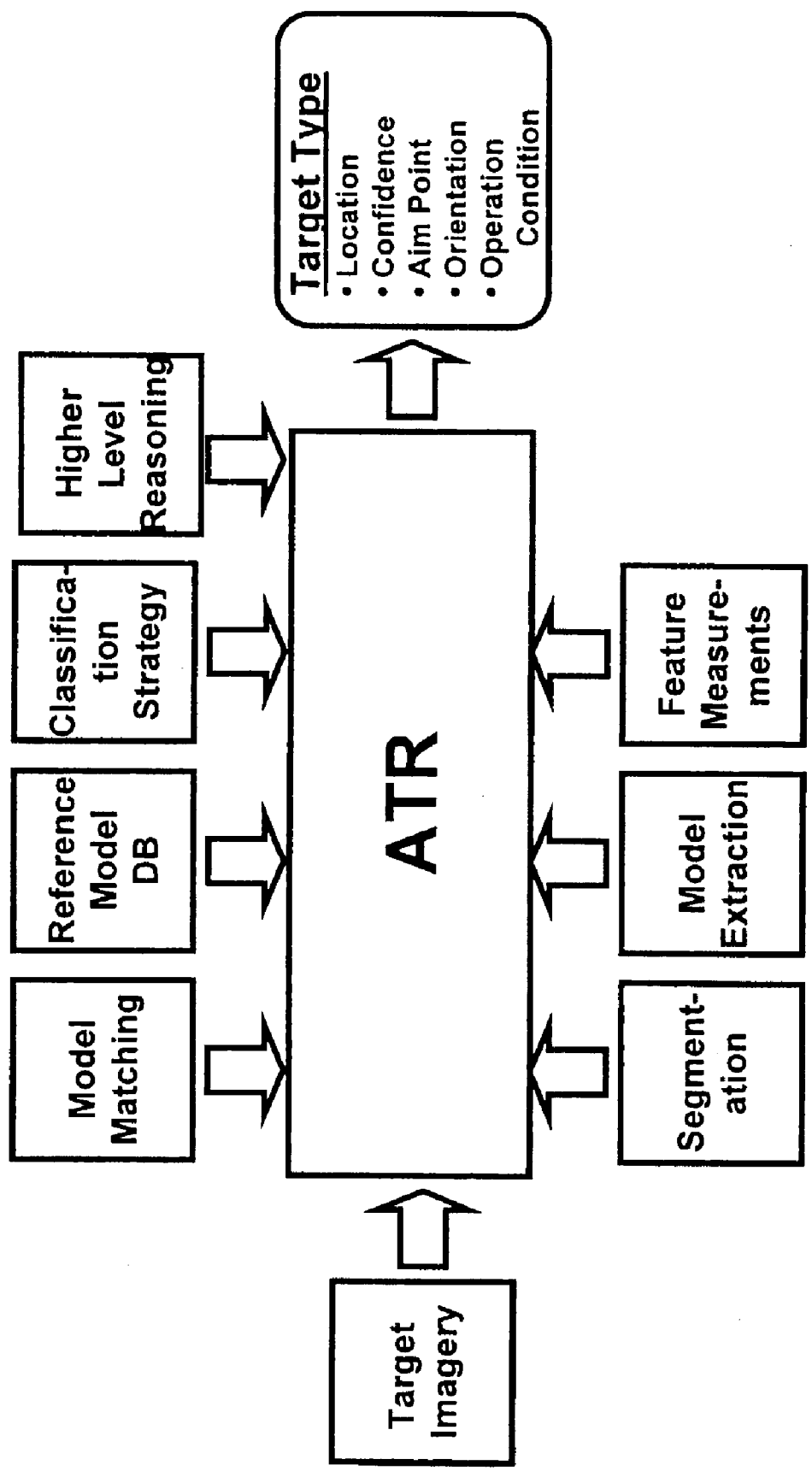
FIG. 1 is a schematic diagram of an automatic target recognition ("ATR") system (prior art)
Figure 2:
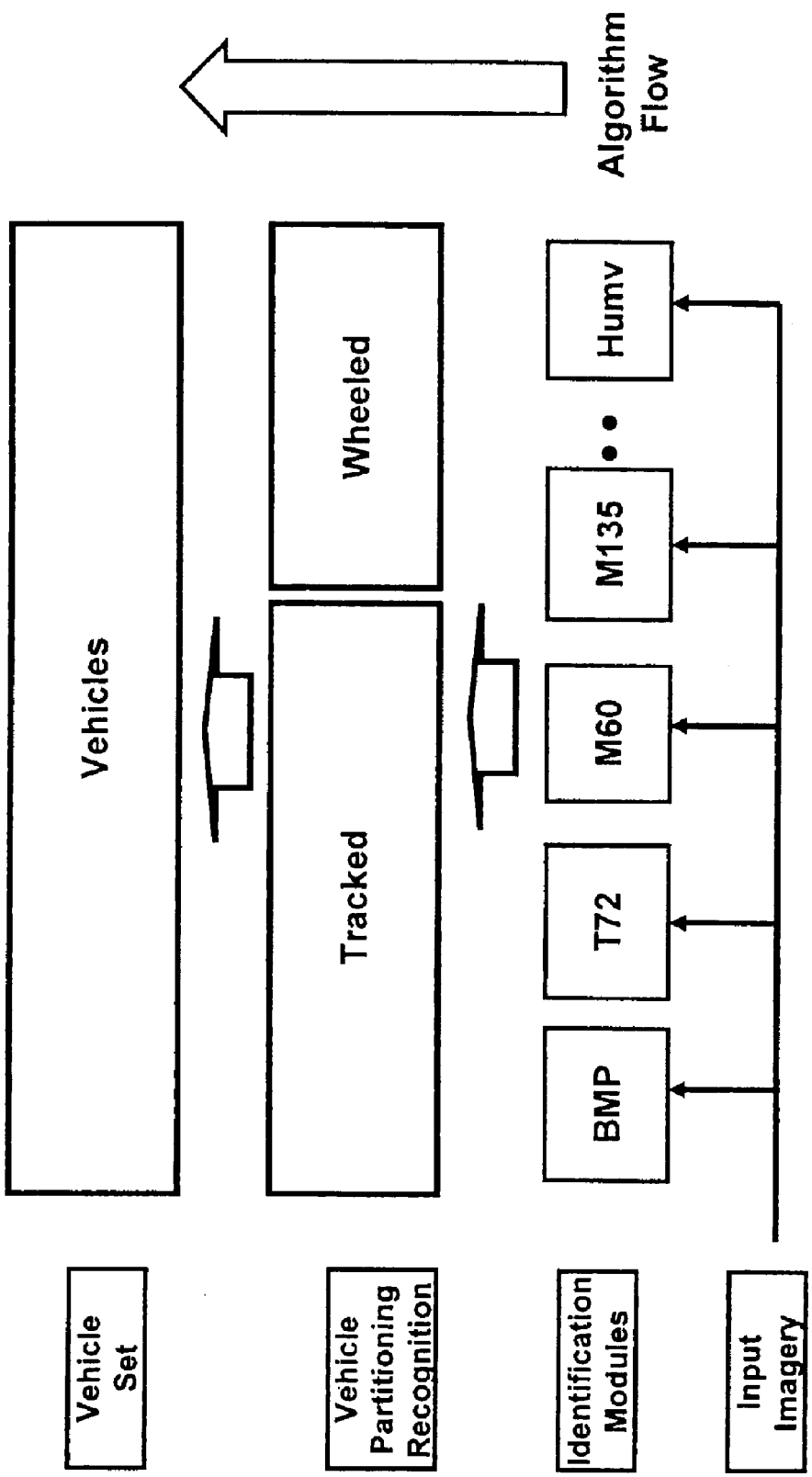
FIG. 2 is a schematic diagram of a bottom-up ATR system's logic flow (prior art)
Figure 3:
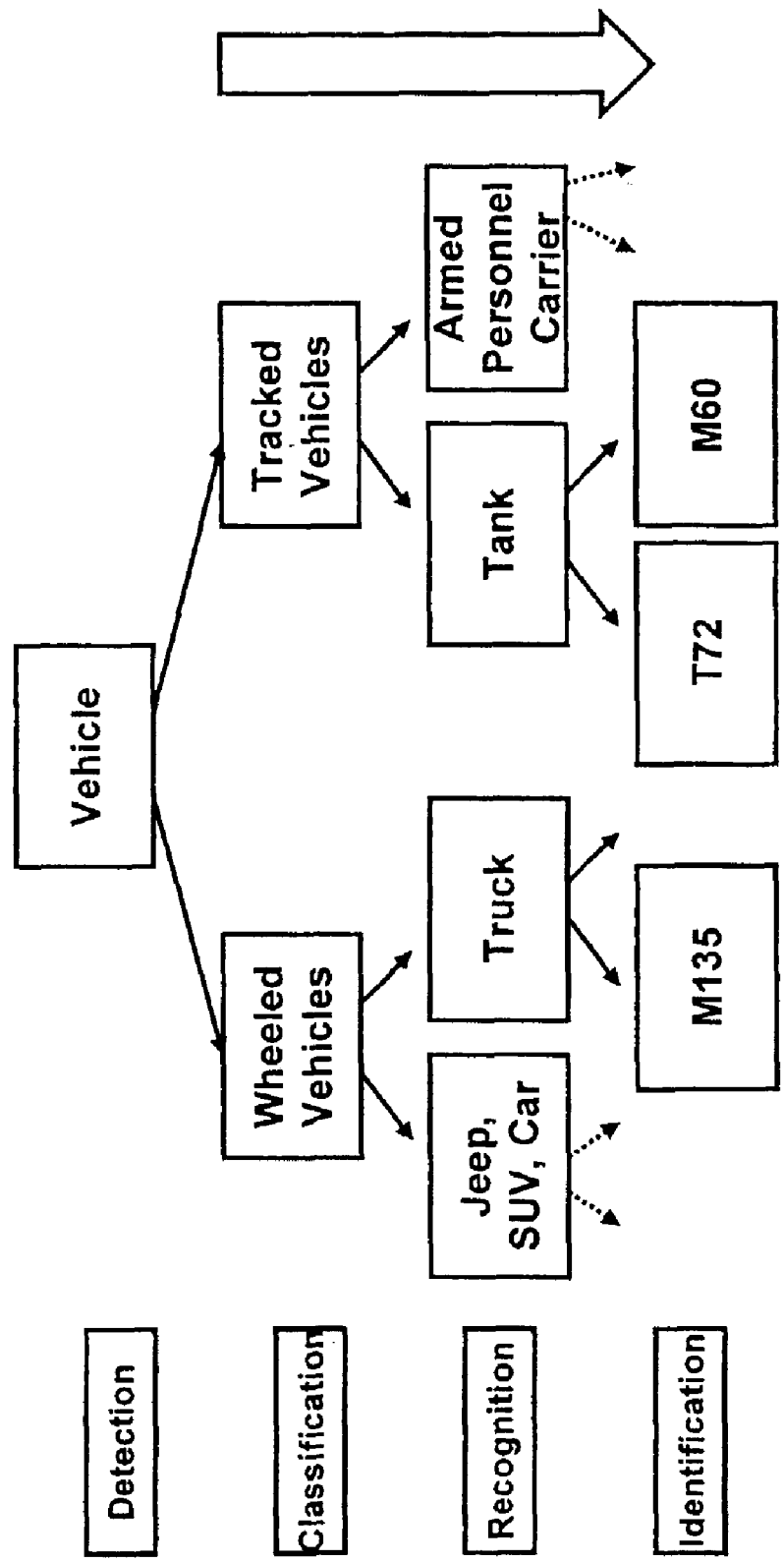
FIG. 3 is a schematic diagram of a top-down ATR system's logic flow (prior art)

Structuring the operation of an ATR system can be either a "bottoms-up" or "top-down" approach, as shown in FIGS. 2 and 3, respectively. Most approaches take on some parts of each. A strict bottom-up ATR system, as shown in FIG. 2, would have a self-contained analysis tool looking for one or more target types directly in the imagery. It could incorporate a template matching or statistical analysis paradigm technique. This approach is useful for cases in which a limited set of specific targets is to be found. It must account for all the variants of the object of interest caused by viewing condition, such as weather, background, target operating temperature, and target pose angles just to name a few. The analysis must be highly tuned so as to let only desired targets through while rejecting others not desired. Once the unique targets have been identified they can be partitioned into a standard object hierarchy.

Improved recognition can be achieved through identified object combination. For example, if an object tank is incorrectly missed at the T72, M60, or other tank class identification stages, information can be salvaged by grouping all the outputs from these individual categories into a tank class. The identification operation could be lower than, for example, 60% individually, but the aggregation of the recognition step could be as high as 90%. This means that the individual identification modules are calling tanks types incorrectly but they are sweeping up all the tanks when operating as single unit.

The complementary approach to FIG. 2 is FIG. 3 top-down analysis. The visual image is decomposed and partitioned using a pre-specified degree of granularity. For this analysis the first step is to locate and determine all the vehicles in the imagery. This function is called vehicle detection or simply detection. The analysis necessary to accomplish this goal is the following: Process the whole image looking for candidates that meet the vehicle criteria. For the sake of speed the image may be processed by multiple steps of image operators, ones that process the whole image quickly looking for locations of interest and those that process these nominated locations with more processing power to refine the decision. The next step in the processing hierarchy is the classification phase, which is the subject of the present invention.

An example classification is to separate vehicles into wheeled and tracked. Depending on how the classification proceeds another partitioning could be armored combatant versus non-armored or support vehicle. Once the vehicles are classified, they are processed by the recognition step. It is this step of refinement that most fire control and weapons guidance systems need to avoid error (such as a "friendly fire" incident). There are times when it is important to tell what type of tank is being imaged and in this case the identification step is invoked.

FIG. 4 illustrates the concept of silhouette analysis of tracked and wheeled vehicles. The vehicle characteristic that separates the wheeled and tread vehicles best is their bottom edge.

FIG. 5 gives an intuitive feel for the separation strength of the bottom silhouette. FIG. 5($a$) shows a number of truck bottom silhouettes. They have been stretched or contracted to fit a common quantized size. FIG. 5($b$) shows these same silhouettes having been low passed filtered. First they were processed by a Fourier analysis and then the higher frequencies or coefficients where set to zero. Next the Fourier parameter space was inverted and shown in FIG. 5($b$). These transformed waveforms show similar characteristic curves. Next, the same operations were done for the tank bottom silhouettes shown in FIG. 5.0($c$) and low pass filtered and displayed in FIG. 5($d$). Again, as a group they show similar shaped curves. Looking between the two groups of trucks and tanks, the waveforms from FIGS. 5($b$) and ($d$) are uniquely different. The intermediate conclusion that can be drawn from this result is that the Fourier analysis of bottom silhouette makes a good feature extraction parametric to separate tanks and trucks.

After careful examination it was found that the bottom silhouette should be better at resolving a truck from and tank but because of the terrain or foliage masking the bottom silhouette, it was not as reliable. Interestingly, as one rotates a target with respect to the low angle-viewing sensor, the silhouette changes to the point where there is confusion between the two classes; however, this not the case for the top silhouette.

Figure 7:
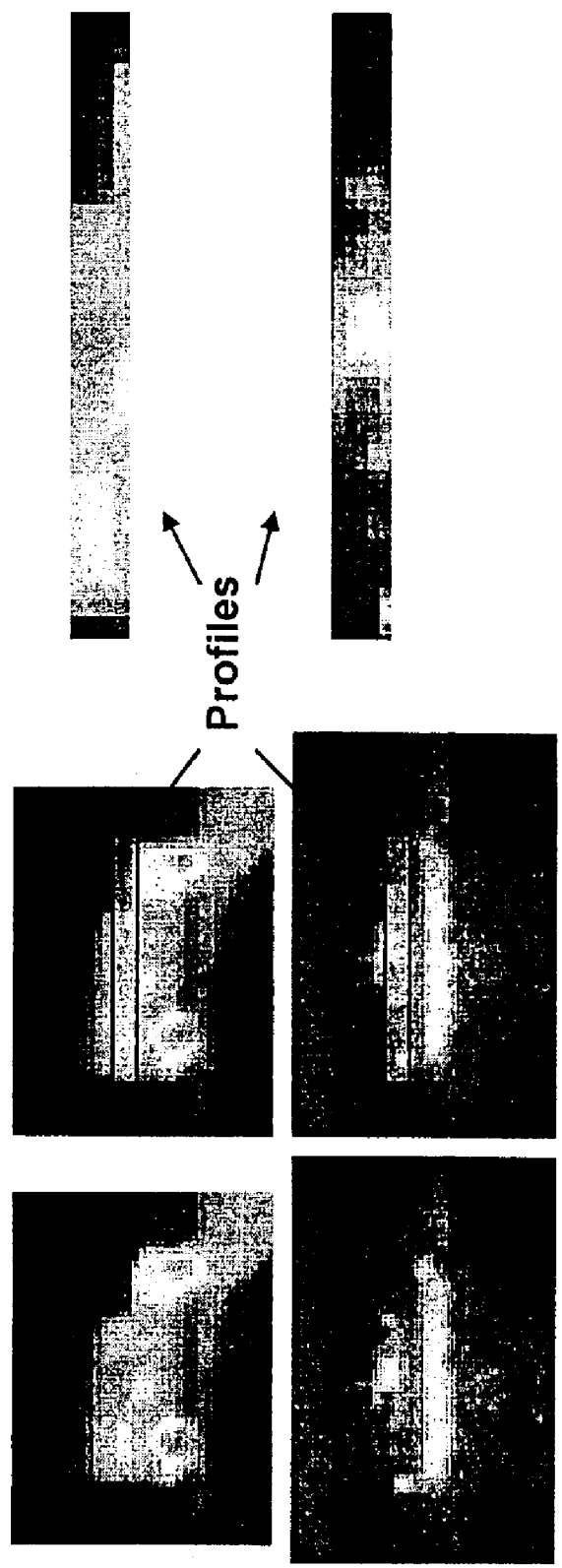
FIG. 7 is a second illustration of the profile analysis component of the present invention at an intuitive level and performed across the object.
Figure 8:
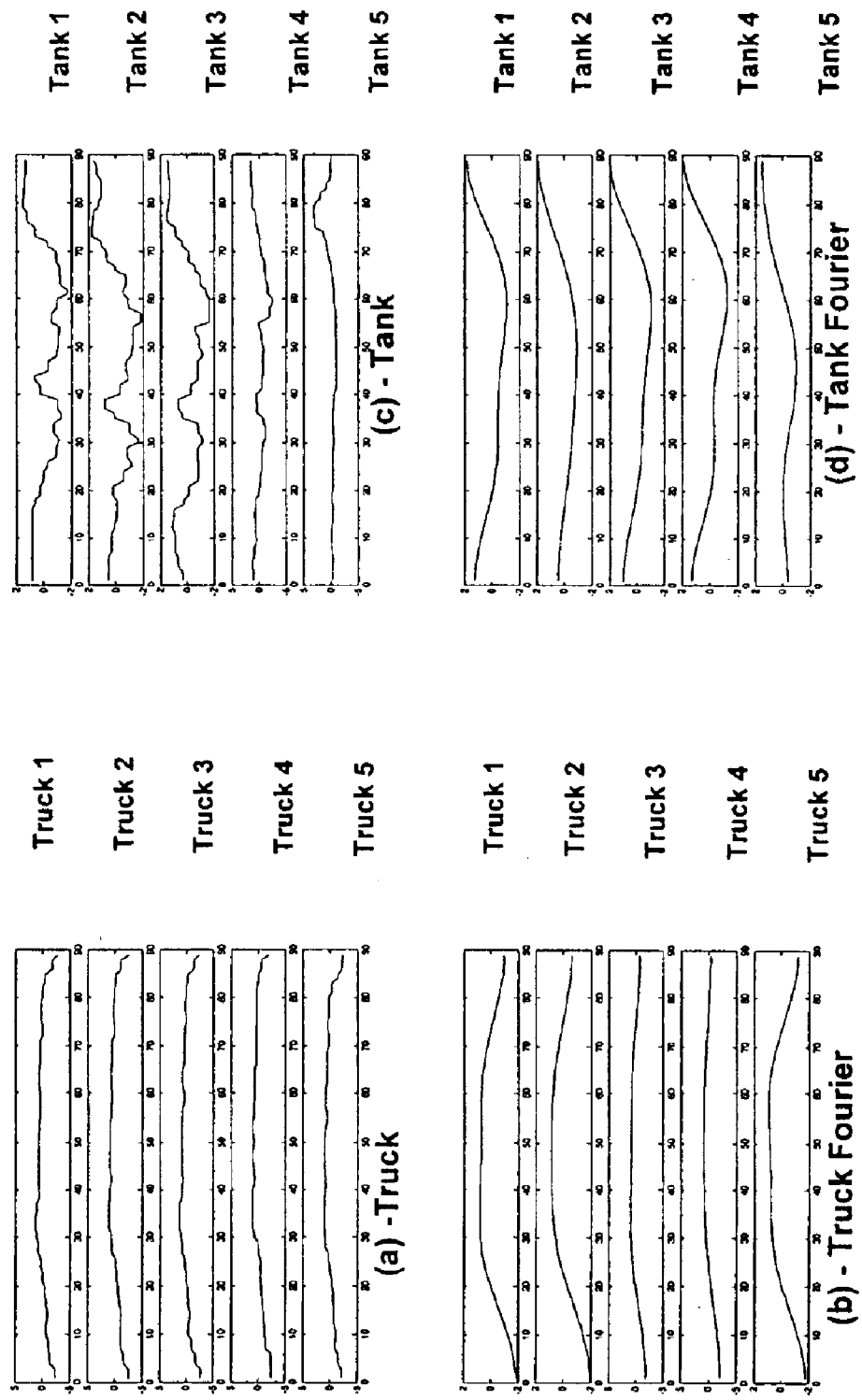
FIGS. 8(a)–(d) illustrate the profile analysis component of the present invention at the Fourier analysis level.
Figure 9:
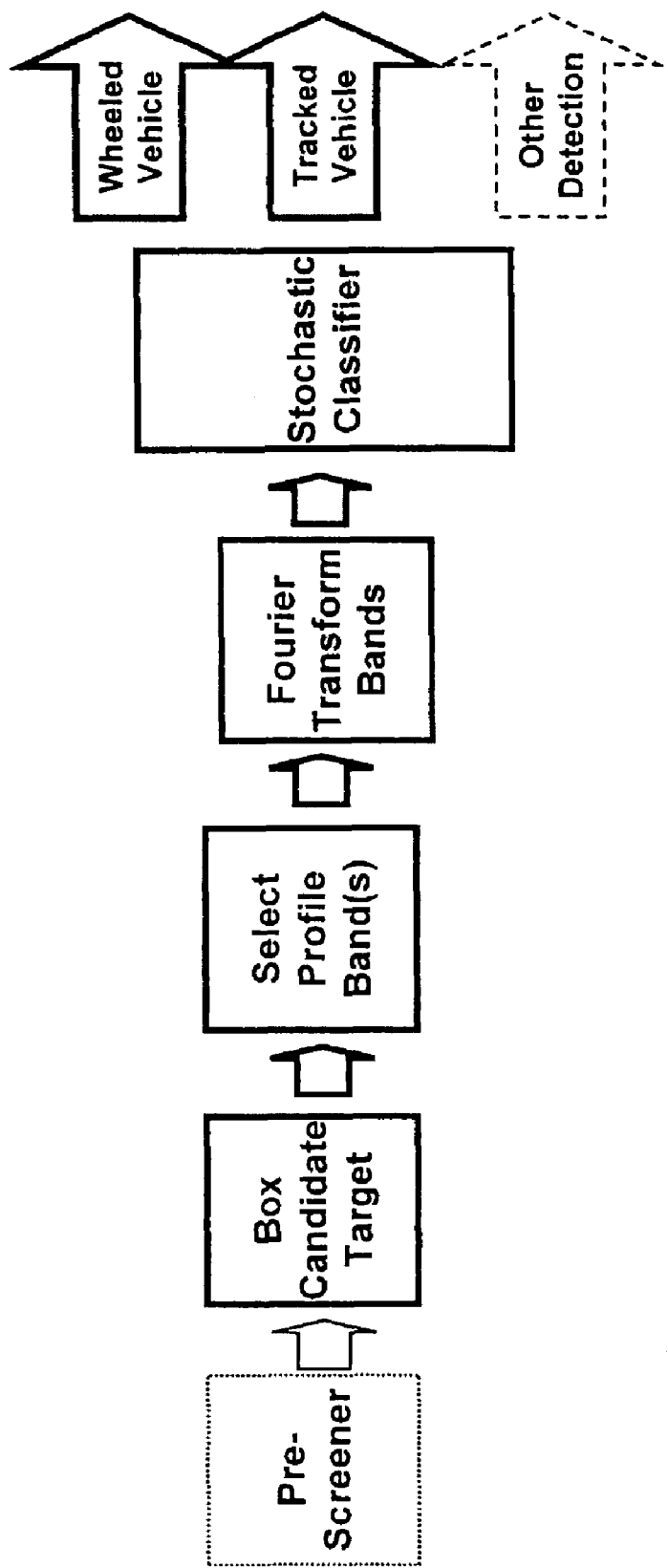
FIG. 9 is a flow diagram for the Fourier profile analysis component of the invention.

Another approach employed by the present invention is a technique called profile analysis. Basically, the smallest window box that completely encloses the target is placed around the target. Next, profiles of the image are extracted horizontally across the boxed target. The same process used for the silhouettes is carried out on the profiles with the addition of one step; the peaks of the profiles are suppressed to reduce the effects of hotspots. FIG. 6 shows boxes that were automatically extracted and the profile locations for 75%, 50%, and 25% points. FIG. 7 shows intuitively what the classifier approach is really working on. Most of the energy for the tank is in the center while the truck energy is off center. As in the case of the silhouettes the inversion of the extracted profiles is used to show what information is being utilized in the classifier. FIG. 8 shows the truck and tank profiles and the Fourier analysis followed by a reconstruction in the space domain.

A classifier approach is preferred that utilizes the vehicle profile feature analysis. FIG. 8 shows the overall flow diagram of this kind of classifier. The first step is the location of the candidate target. This process is performed by a pre-screener, as understood by one of ordinary skill in the art. The pre-screener passes the centroid of the candidate target to the target window box routine. Here the best box that encloses the target is synthesized. The box can be generated very simply by examining the edge direction or it can be generated by a sophisticated target segmenter. In either case, the next step is to select the profile bands and run the Fourier analysis on the profile bands. The resulting frequency bands are packed up as a feature set and sent to the classifier for vehicle classification.

The following presents pseudocode and description for the main routines of the VPC of the present invention as used to classify wheeled from tracked vehicles using profile analysis (which could be supplemented by silhouette analysis according to the invention). As readily understandable to one of ordinary skill in the art, the method, apparatus, and software of the invention can be employed to classify any sets of visual objects into two or more classes with appropriate adjustments and training of the system.

Figure 10:
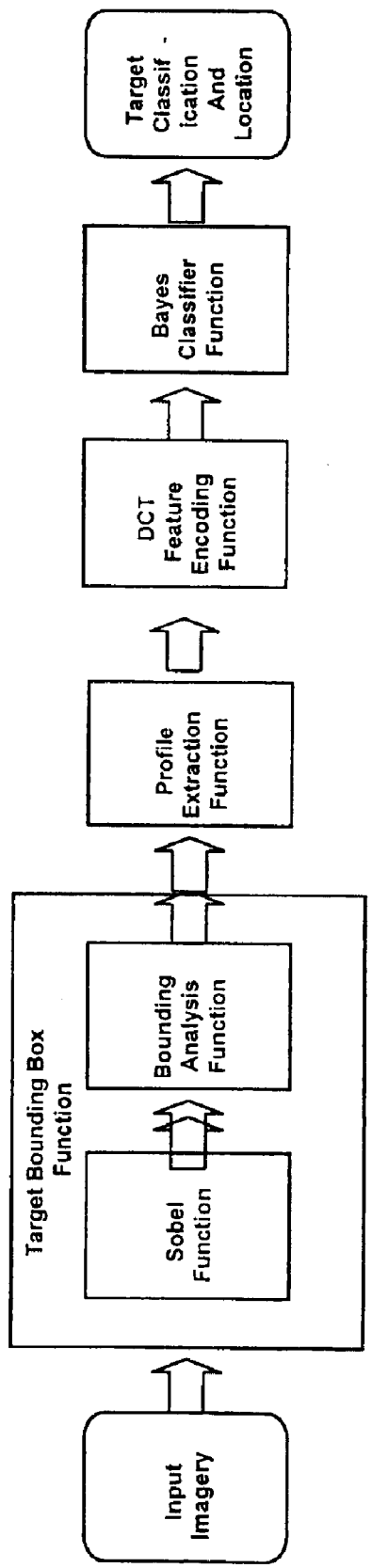
FIG. 10 is a flow diagram for the example system of the invention using profile analysis (not supplemented by silhouette analysis) to classify objects.

The function of the VPC is to classify vehicles into one of two categories, wheeled or tracked. It is also responsible for passing on those declarations and their (x,y) locations in image coordinates. The VPC comprises the following functions:

1. Target Box Centering Function
2. Sobel Function
3. Bounding Analysis Function
4. Profile Extractor Function
5. Discrete Cosine Transform (DCT) Feature Encoding Function
6. Tracked/Wheeled Classifier Function FIG. 10 shows the top-level algorithm flow diagram for the exemplary VPC system.

The purpose of the Target Bounding Box Function is to enclose the candidate target by a bounding box. This box is needed to perform the feature extraction of the candidate target.

The Target Bounding Box Function uses the centroid and the estimated target range to place an initial box around the candidate target. The Target Bounding Box Function refines this box using the following steps:

1. Window the image, only processing pixels inside the initial box.
2. Calculate the Sobel operator inside this window.
3. Threshold the Sobel gradient pixels based on the upper percentile.
4. If range is less than 4000 meters, eliminate the gradient pixels whose directions are horizontal else keep all directions.
5. If the range to the target is less than or equal to 2500 meters and there are at least ten pixels on the target in both X and Y directions, the bounding box is separated into ten partitions, both vertically and horizontally. The partitions that contain fewer than a set threshold of pixels will be zeroed out.
6(a). Eliminate stray single pixels at ranges between 3750 meters and 3000 meters.
6(b). For ranges less than 3000 meters turn on all pixels inside the bounding box that have five of their eight neighbors on and turn the remaining pixels off.
6. Box the remaining gradient pixels.

These operational steps are spread out over two sub functions, Sobel and Bounding Analysis Functions.

The initial box size is preferably computed from the range using the equations below:

$$\Theta_p \times r \times n_p = s$$

$$n_p = \frac{s}{\Theta_p \times r}$$

$$n_{wp} = \frac{\max w}{\Theta_p \times r}$$

$$n_{hp} = \frac{\max h}{\Theta_p \times r}$$

where
$\Theta_P$ is the pixel's angular extent
$n_P$ is the number of pixels across target
r is the range to the target in meters
s is the length of the linear dimension
$n_{wp}$ is the width in pixels
$n_{hp}$ is the height in pixels As an example, the following values might be appropriate for a given application:
$\Theta_p = 0.116 \times 10^{-3}$
max w=10 m
max h=4 m This process is done for each of the incoming candidate target positions. Once the initial box is placed on the image, the box acts as a mask and is Anded with the original image. This leaves only a window inside the image that contains the candidate target. The Sobel Function is applied to this window image and the resulting gradient magnitudes and directions are thresholded by the Threshold Function.

Figure 11:
FIG. 11 illustrates gradient pixels from the Sobel (or equivalent nonlinear edge-enhancement technique) and threshold operations in the example system.

The Bounding Analysis Function takes the results of the Sobel operation and completes the rest of the Target Bounding Box Function. The first step is to threshold the gradient window produced by the Sobel. The Sobel window image is comprised of pixels with both an associated magnitude and edge directions. Thresholding of this image is based on the sorting of the magnitude pixel values. The highest 40% of the magnitudes are kept by setting the magnitude to one and those pixels whose value is lower than this threshold are set to zero. All pixels whose magnitudes are equal to zero have their directions set to zero. FIG. 11 illustrates gradient pixels from the sobel and threshold operations.

Figure 12:
FIG. 12 illustrates the gradient pixels after removing horizontal lines.

If the range to the target is less than 4000 meters, the pixels whose directions that correspond to horizontal lines (direction 1 and direction 5) have their magnitude and directions zeroed. This leaves pixels whose gradient magnitude and direction meet the above requirements. If the range to the target is greater than 4000 meters, all directions are kept. FIG. 12 illustrates gradient pixels after removing horizontal lines.

Figure 13:
FIG. 13 illustrates vertical partitions.
Figure 14:
FIG. 14 illustrates horizontal partitions.

Next, if the range to the target is less than 2500 meters, the bounding box is separated in ten portions, both vertically and horizontally. FIG. 13 illustrates vertical partitions and FIG. 14 illustrates horizontal partitions.

Figure 15:
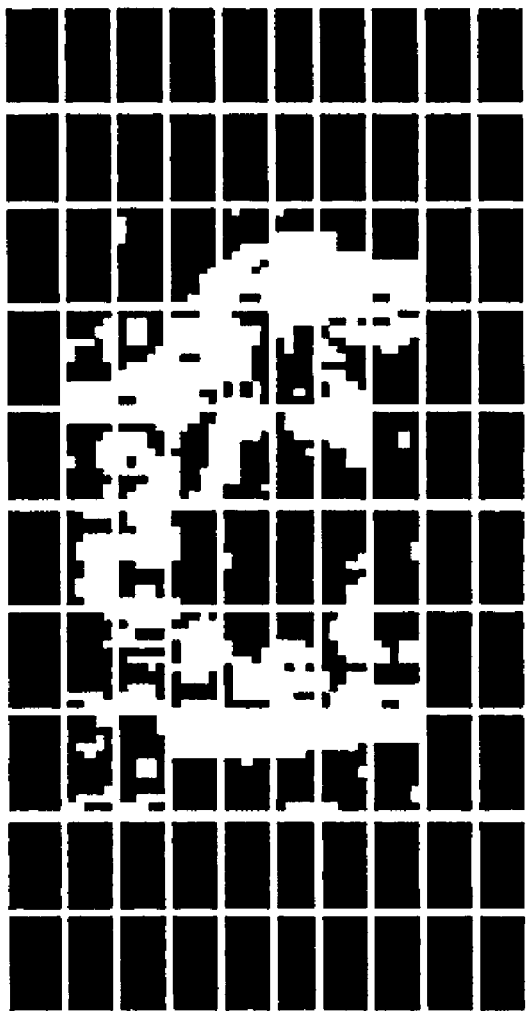
FIG. 15 illustrates all partitions combining the patterns of FIGS. 13 and 14.
Figure 16:
FIG. 16 illustrates results after a first iteration of the clutter removal procedure of the invention.
Figure 17:
FIG. 17 illustrates results after a second iteration of the clutter removal procedure of the invention.
Figure 18:
FIG. 18 illustrates results after a tenth iteration of the clutter removal procedure of the invention.

Compare the number of pixels that are turned on in each section to the average number of pixels for each section. If the number of pixels in a given section is less than 75% of the average then turn all pixels in that section off. For each of the ten iterations do a horizontal section followed by a vertical section before moving on to the next iteration. FIG. 15 illustrates this operation after the first iteration, FIG. 16 after the second iteration, and FIG. 17 after ten iterations. FIG. 18 illustrates all partitions. This step will remove most of the clutter from around the target.

To remove the remainder of the clutter each pixel is compared to its neighbors. Given that the range to the target is less than 3750 meters but greater than 3000 meters, all pixels that are completely surrounded by zero pixels are themselves set to zero. If the range to the target is less than 3000 meters, all pixels that have the majority of their eight neighbors equal to one are set to one and all others are set to zero. This forms a cleaning operation to eliminate stray pixels on highly resolved targets.

Figure 19:
FIG. 19 illustrates results of further clutter removal by the invention.

Finally, the minimum enclosed box is next calculated using the remaining gradient pixels. This is accomplished by finding the maximum x and y extent and the minimum x and y extent. This forms the minimum enclosed box. FIG. 19 illustrates an image used to calculate the minimum enclosed box The purpose of the Sobel function is to create an edge magnitude and direction image from the raw sensor input imagery window.

Figure 20:
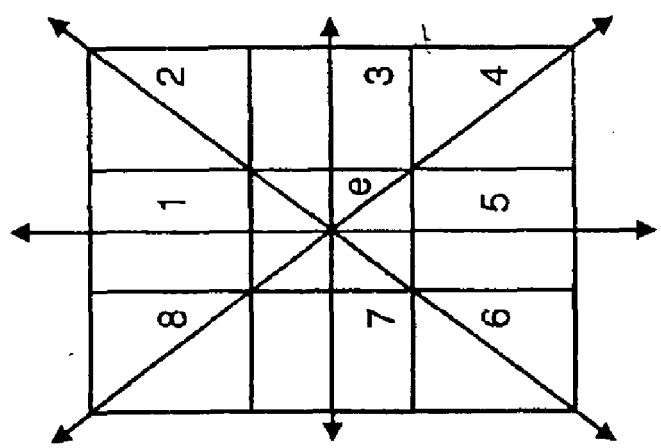
FIG. 20 is a map of Sobel neighborhood and directions employed by the invention.

The Sobel function operates on the intensity values of the image to produce two images. One image contains the gradient of the image intensities and other contains the direction of these gradients. Processing is accomplished by operating on each pixel "e" with a neighborhood operator shown in FIG. 20 with the following equations:

$$D_x = a + 2 \times d + g - (c + 2 \times f + i)$$

$$D_y = a + 2 \times b + c - (g + 2 \times h + i)$$

$$Mag = abs(D_x) + abs(D_y)$$

$$Dir = \arctan\left(\frac{D_y}{D_x}\right)$$

where Dir is quantized to eight directions. Both a gradient value and a gradient direction value are produced. They are placed in the gradient image and direction image, respectively. The directions are quantized to one of 8 unique directions as shown in FIG. 20. The gradient value is produced by first the $D_x$ direction and then the $D_y$ direction for each individual pixel. These individual gradient components are combined via the absolute value or city block distance. Next, slope is calculated by dividing $D_x$ into $D_y$. The slope is then converted into an angular direction by taking the inverse or arctangent. Lastly, this angle, which can range from 0 to 360 degrees, is converted into one of 8 directions by quantizing the resulting angle ever 45 degrees. The direction 1 starts at −22.5 degrees and goes to 22.5 degrees. Each successive direction is obtained by adding 45 degrees to the bonds and 1 to the direction number.

The Profile Extraction Function uses the target box to extract various horizontal profiles across the target.

The profiles are extracted across the target. A profile vector is a vector of intensity values taken from the image, from the left column to the right column (of the bounding box) of the row that represents a given percentage (e.g., 80%) distance from the bottom to the top row. The vector is normalized by subtracting off its mean and then dividing by its standard deviation.

To suppress any potential hotspots, each value in the profile vector is evaluated. If a value is greater than the mean of the Profile vector plus half of the standard deviation, then that value is set to the mean of the vector plus half of its standard deviation.

DCT Feature Encoding operates as follows: The number of elements in the profile vector is normalized to contain 90 elements. If the profile vector does not have exactly 90 elements, treat the profile vector as a continuous curve then linearly interpolated across the curve to get 90 evenly distributed elements. This interpolation can be done by using the equation below:

$$f(i) = g\left(\text{floor}\left[\frac{N}{90} * i + 0.5\right]\right)$$

where g(i) is the extracted profile and f(i) is the interpolated 90 element profile.

The Discrete Cosine Transform for Y is computed for the first 7 coefficients using the following equation:

$$C(u) = \sqrt{\frac{2}{N}} \sum_{x=0}^{N-1} f(x) \cos\left(\frac{(2 \times x + 1) \times u \times \pi}{2 \times N}\right)$$

where f(x)=Y(x), N=90, and u=the number of the coefficient being computed, (1:7).

$$FV = [C_1(1:7)],$$

where $C_1$ is a vector of the coefficients for the top profile.

The Bayes Classifier Function processes the feature vector X produced for each candidate target and determines if the vector X comes from a wheeled or a tracked vehicle.

The Bayes Classifier Function makes its determination by computing the distance of the feature vector to each of the two possible classes, wheeled or tracked vehicles. Each of these two distances is compared to see which is smaller, $d_1$ or $d_2$. For the present example, Class=1 if tracked, Class=2 if wheeled.

The constants for the Bayes Classifier Function are as follows:

$$A = \frac{1}{2}\ln\left|\sum_2\right| - \frac{1}{2}\ln\left|\sum_1\right|$$

$$C_1 = -\sum_1^{-1}$$

$$C_2 = -\sum_2^{-1}$$

The calculations are as follows for the Bayes Classifier Function:

$$Y_1 = X - M_1$$

$$Y_2 = X - M_2$$

$$d_1 = Y_1^T C_1 Y_1 + A$$

$$d_2 = Y_2^T C_2 Y_2$$

if $d_1^2 > d_2^2$ then Wheeled else Tracked

The above example of the operation of the visual profile classifier method and software of the invention is extensible by one of ordinary skill in the art to other objects than vehicles and to sets of classifications of order greater than two.

Figure 21:
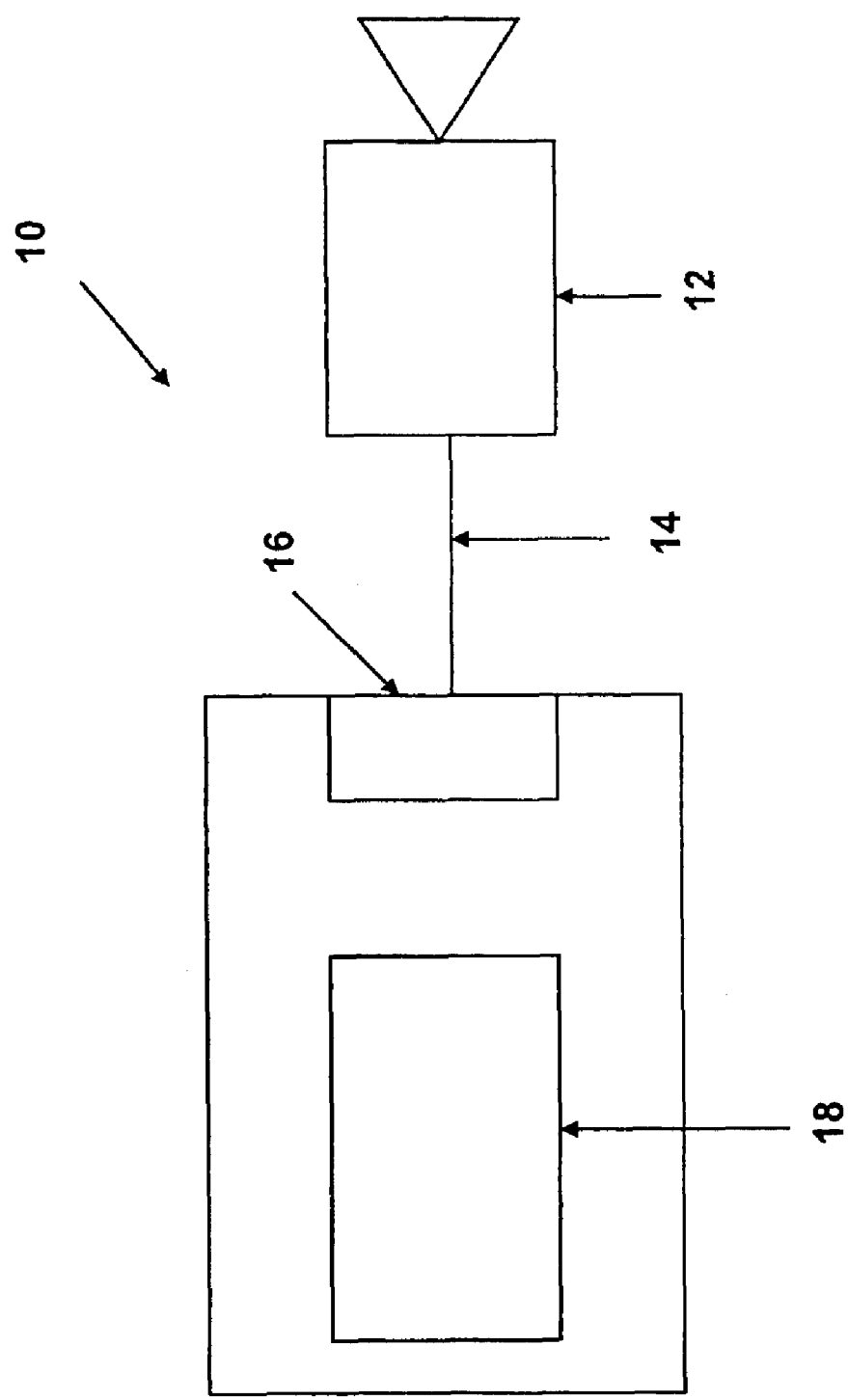
FIG. 21 is a block diagram of the preferred apparatus of the invention.

The preferred apparatus 10 of the invention is shown in FIG. 21, comprising video capture device 12, communications link 14, data input port 16 (which may additionally comprise an analog-to-digital converter if video input is initially analog), and microprocessor 18 executing the method and computer software of the invention. The software provided to the microprocessor embodying the method of the invention can be employed with, for example, Matlab® mathematical analysis software or coded in any applicable programming language.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An automated method of classifying objects visually into one of a plurality of object types, the method comprising in the order presented the automated steps of:
   receiving a still image including an object;
   bounding the object within the image;
   dividing the bound portion of the image into a plurality of profile sections;
   performing a transform on each of the profile sections selected from the group consisting of discrete cosine transforms and discrete Fourier transforms; and
   executing a Bayes classifier function to segregate the object into one of the object types.

2. The method of claim 1 wherein the object is a vehicle.

3. The method of claim 2 wherein the plurality of object types comprises a wheeled vehicle type and a tracked vehicle type.

4. The method of claim 1 wherein the executing step comprises executing a naive Bayes classifier function.

5. The method of claim 1 additionally comprising the step of performing clutter removal after the bounding step.

6. The method of claim 1 additionally comprising the step of performing a non-linear edge-enhancement function on the image before the dividing step.

7. The method of claim 6 additionally comprising the step of performing a Sobel function on the image before the dividing step.

8. The method of claim 7 additionally comprising the step of performing a thresholding function on the image after the step of performing a Sobel function and before the dividing step.

9. Computer software for classifying objects visually into one of a plurality of object types, said software comprising:
   means for receiving a still image including an object;
   means for bounding the object within the image;
   means for dividing the bound portion of the image into a plurality of profile sections;
   means for performing a transform on each of the profile sections selected from the group consisting of discrete cosine transforms and discrete Fourier transforms; and
   means for executing a Bayes classifier function to segregate the object into one of the object types.

10. The software of claim 9 wherein said executing means comprises means for executing a naive Bayes classifier function.

11. The software of claim 9 additionally comprising means for performing clutter removal after bounding.

12. The software of claim 9 additionally comprising means for performing a non-linear edge-enhancement function on the image before dividing.

13. The software of claim 12 additionally comprising means for performing a Sobel function on the image before dividing.

14. The software of claim 13 additionally comprising means for performing a thresholding function on the image after performing a Sobel function and before dividing.

15. An apparatus for classifying objects visually into one of a plurality of object types, said apparatus comprising:
   means for receiving a still image including an object;
   means for bounding the object within the image;
   means for dividing the bound portion of the image into a plurality of profile sections;
   means for performing a transform on each of the profile sections selected from the group consisting of discrete cosine transforms and discrete Fourier transforms; and
   means for executing a Bayes classifier function to segregate the object into one of the object types.

16. The apparatus of claim 15 wherein said executing means comprises means for executing a naive Bayes classifier function.

17. The apparatus of claim 15 additionally comprising means for performing clutter removal after bounding.

18. The apparatus of claim 15 additionally comprising means for performing a non-linear edge-enhancement function on the image before dividing.

19. The apparatus of claim 18 additionally comprising means for performing a Sobel function on the image before dividing.

20. The apparatus of claim 19 additionally comprising means for performing a thresholding function on the image after performing a Sobel function and before dividing.

* * * * *